US009521112B2

(12) United States Patent
Efrati (10) Patent No.: US 9,521,112 B2
(45) Date of Patent: Dec. 13, 2016

(54) SYSTEMS AND METHODS OF ASSIGNING AND USING VIRTUAL TELEPHONE NUMBERS

(71) Applicant: VONAGE AMERICA INC., Holmdel, NJ (US)

(72) Inventor: Tzahi Efrati, Givataim (IL)

(73) Assignee: VONAGE AMERICA INC., Holmdel, NJ (US)

( * ) Notice: Subject to any disclaimer, the term of this patent is extended or adjusted under 35 U.S.C. 154(b) by 0 days.

(21) Appl. No.: 14/027,856

(22) Filed: Sep. 16, 2013

(65) Prior Publication Data
US 2015/0078370 A1    Mar. 19, 2015

(51) Int. Cl.
*H04L 29/12*    (2006.01)
*H04L 29/08*    (2006.01)

(52) U.S. Cl.
CPC ............. *H04L 61/605* (2013.01); *H04L 67/30* (2013.01); *H04L 61/1594* (2013.01); *H04L 61/20* (2013.01)

(58) Field of Classification Search
CPC ................................ H04L 61/605; H04M 3/42
USPC ........................................ 370/352; 455/414.1
See application file for complete search history.

(56) References Cited

U.S. PATENT DOCUMENTS

| 7,346,156 | B1 | 3/2008 | Choupak et al. |
| 7,386,111 | B2 | 6/2008 | Holder |
| 7,680,262 | B2 | 3/2010 | Holder |
| 8,064,582 | B2 | 11/2011 | Ma et al. |
| 8,213,594 | B2 | 7/2012 | Holder |
| 8,306,201 | B1 * | 11/2012 | Borislow .......... H04M 3/42059 379/142.01 |
| 8,422,655 | B2 | 4/2013 | Choupak et al. |
| 8,588,387 | B2 | 11/2013 | Ma et al. |
| 8,600,364 | B2 | 12/2013 | Fighel |
| 2004/0264663 | A1 | 12/2004 | Enzmann et al. |
| 2007/0047532 | A1 | 3/2007 | Bangor et al. |
| 2007/0242809 | A1 | 10/2007 | Mousseau et al. |
| 2010/0144323 | A1 * | 6/2010 | Collins ................. G06Q 10/10 455/414.1 |

OTHER PUBLICATIONS

Aug. 17, 2015 Office Action issued in U.S. Appl. No. 14/027,968.
Mar. 11, 2015 Office Action issued in U.S. Appl. No. 14/027,968.

* cited by examiner

*Primary Examiner* — Mohamed Kamara
*Assistant Examiner* — Thad Defauw
(74) *Attorney, Agent, or Firm* — Nixon & Vanderhye P.C.; Joseph Pagnotta (57) ABSTRACT

A single virtual telephone number that is used to route telephony communications is assigned to first and second users if the first and second users rarely, if ever, communicate with the same party. When an incoming call is received on the virtual telephone number, telephony information for the first and second users is reviewed to determine if the calling party is one that has communicated with either of the first and second users in the past. If so, the telephony communication is routed to the user who has communicated with the calling party in the past.

17 Claims, 5 Drawing Sheets

SYSTEMS AND METHODS OF ASSIGNING AND USING VIRTUAL TELEPHONE NUMBERS

BACKGROUND OF THE INVENTION

The invention is related to virtual telephone numbers which can be used to route telephony communications to a telephony device having its own separate telephone number.

Virtual telephone numbers have been used by Internet Protocol (IP) telephony systems to route telephony communications to their customers at a lower cost than would be possible if the telephony communications were routed via a publically switched telephone network (PSTN) or a cellular telephony network. A customer located in a first country and having a telephony device with a telephone number from the first country can have the IP telephony system assign him a virtual telephone number in a second country. A caller located in the second country can then place a telephone call to the virtual telephone number, which will be a local call for the calling party. The call is received by the IP telephony system on the virtual telephone number, and the IP telephony system routes the call to the customer's telephony device in the first country over the Internet. Although the customer is charged for this service, the charges for routing a call between the calling party in the second country and the customer in the first country are considerably less than the cost of placing an international long distance call from the calling party in the second country to the customer in the first country.

A single customer can have the IP telephony system assign him multiple virtual telephone numbers. In some instances, each virtual telephone number would be from a different country, or a different geographical area within a single country. Regardless of which virtual telephone number is called, the telephony communications are all routed to the customer's regular telephony device, which typically has its own different telephone number.

Unfortunately, there is a cost associated with acquiring and maintaining virtual telephone numbers. The cost of obtaining a virtual telephone number varies by location, and in some locations, it can be relatively high. For this reason, it would be desirable to assign the same virtual telephone number to multiple customers. Doing so, however, is problematic. If the same virtual telephone number is assigned to first and second customers, when an incoming telephony communication directed to the virtual telephone number is received, one cannot know which of the first and second customers the calling party is attempting to reach.

What is needed is a way to assign a single virtual telephone number to multiple customers such that it is still possible to route telephony communications directed to the virtual telephone number to the proper party.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text or video communications using Internet protocol data communications.

Figure 1:
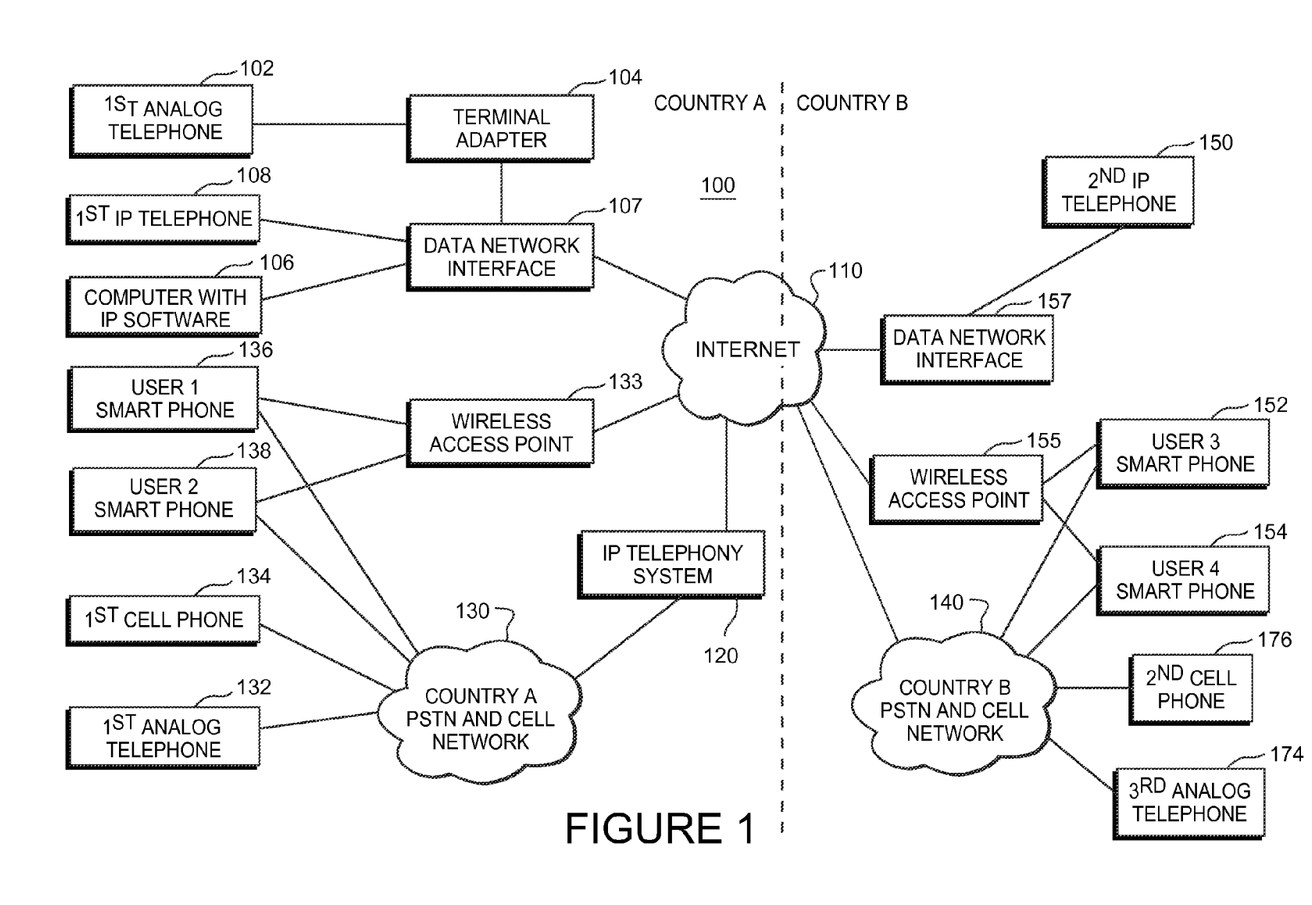
FIG. 1 is a diagram of a communications environment including various elements which are associated with a telephony system operating in accordance with the invention.

As illustrated in FIG. 1, a communications environment 100 is provided to facilitate IP based communications. An IP telephony system 120 enables connection of telephone calls between its own customers and other parties via data communications that pass over a data network. The data network is commonly the Internet 110, however, private data networks may form all or a portion of the data communication path. The IP telephony system 120 is connected to the Internet 110. In addition, the IP telephony system 120 is connected to a publicly switched telephone network (PSTN) and a cellular telephony network 130 located in country A. For purposes of the following description, the reference number 130 is used to identify both a PSTN and a cellular telephony network in country A. In some instances, the IP telephony system 120 communicates with the PSTN or cellular network in country A 130 via a gateway (not shown). The gateway could be a part of the IP telephony system 120, or the gateway could be maintained by a third party, such as the PSTN or cellular network 130.

Customers of the IP telephony system 120 can place and receive telephone calls using an IP telephone 108 that is connected to the Internet 110 via a data network interface device 107. The IP telephone 108 could be connected to the data network interface device 107 via a wired or wireless connection.

Alternatively, a customer could utilize a first analog telephone 102 which is connected to the Internet 110 via a terminal adapter 104 and the data network interface 107. The terminal adapter 104 converts analog signals from the first analog telephone 102 into digital data signals that pass over the Internet 110, and vice versa. Analog telephone devices include, but are not limited to, standard telephones and document imaging devices such as facsimile machines.

In addition, a customer could utilize IP telephony software running on a computer 106 to place and receive IP based telephone calls, and to access other IP telephony systems (not shown). In some instances, the IP telephony software could be assigned its own telephone number. In other instances, the IP telephony software could be associated with a telephone number that is also assigned to the IP telephone 108, or to the terminal adaptor 104 that is connected to the first analog telephone 102.

A third party using a second analog telephone 132 which is connected to the PSTN in country A 130 may call a customer of the IP telephony system 120. In this instance, the call is initially connected from the second analog telephone 132 to the PSTN in country A 130, and then from the PSTN in country A 130 to the IP telephony system 120. The IP telephony system 120 then routes the call to the customer's IP telephony device. A third party using a first cellular telephone 134 could also place a call to an IP telephony system customer, and the connection would be established in a similar manner, although the first link would involve communications between the first cellular telephone 134 and a cellular telephone network in country A 130.

In addition, mobile computing devices which include cellular telephone capabilities, such as smart phones, could also be used to place telephone calls to customers of the IP telephony system. FIG. 1 illustrates first and second user smart phones 136, 138, which include cellular telephony capabilities. The first and second user smart phones 136, 138 receive their primary service from the cellular telephone network in country A 130. The cellular telephone network in country A will have assigned telephone numbers to each of the first and second user smart phones 136, 138. Thus, telephony communications directed to the telephone number assigned to the first user's smart phone 136 are connected to the first user's smart phone 136 via the cellular telephone network in country A 130. Likewise, telephony communications directed to the telephone number assigned to the second user's smart phone 138 are also connected to the second user's smart phone 138 by the cellular telephone network in country A 130.

However, the first and second user smart phones 136, 138 may also connect to the Internet 110 via a wireless access point 133, such as a Wi-Fi or WiMAX router. Once connected to the Internet 110, IP telephony software running on the first and second user smart phones 136, 138 could be used to conduct telephony communications via the IP telephony system 120.

Users of the first IP telephony system 120 are able to access the service from virtually any location where they can connect to the Internet 110. Thus, a customer could register a second IP telephone 150 with the IP telephony system 120 in country A, and that customer could then use the second IP telephone 150 while it is located in country B, as illustrated in FIG. 1. Once the second IP telephone 150 connects to the Internet 110 via a data network interface 157 located in country B, the second IP telephone 150 can connect to the IP telephony system 120 in the same manner as if the second IP telephone 150 were located in country A.

FIG. 1 also illustrates that third and fourth user smart phones 152, 154 located in country B can connect to the Internet 110 via a wireless access point 155 located in country B. The third and fourth user smart phones 152, 154 located in country B also can connect to a cellular network in country B 140. A second cell phone 176 located in country B can also connect to the cellular network in country B 140 to send and receive telephony communications. Further, a third analog telephone 174 in country B can connect to a PSTN in country B 140 to send and receive telephony communications. For purposes of this description, the cellular telephone network and PSTN in country B are identified with the same reference number 140.

Figure 2:
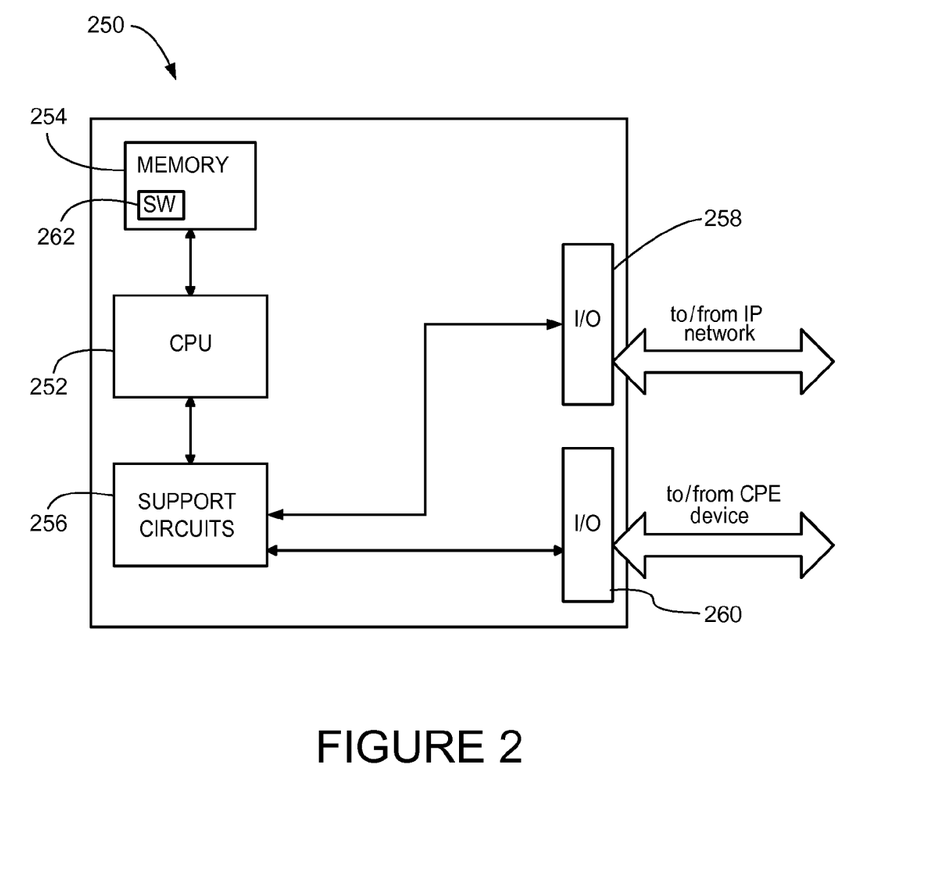
FIG. 2 is a diagram of various elements of a processor that forms part of a telephony system.

FIG. 2 illustrates elements of a computer processor 250 that can be used as part of the IP telephony system 120 to accomplish various functions. The IP telephony system 120 could include multiple processors 250 located at various locations in the system, along with their operating components and programming, each carrying out a specific or dedicated portion of the functions performed by the IP telephony system 120.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment, to service provider equipment, to and IP network or gateways, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routines could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

In the foregoing and following descriptions, references are made to an "IP telephony device." This term is used to refer to any type of device which is capable of interacting with an IP telephony system to conduct a telephony communication. An IP telephony device could be an IP telephone, a computer running IP telephony software, a terminal adapter which is connected to an analog telephone, or some other type of device capable of communicating via data packets. An IP telephony device could also be a cellular telephone, a smart phone, or a portable or tablet computing device that runs IP telephony software that enables the device to act as an IP telephony device. Thus, a single device might be capable of operating as both a cellular telephone and an IP telephony device.

Moreover, certain devices that are not traditionally used as telephony devices may act as IP telephony devices once they are configured with appropriate software. Thus, some devices that would not normally be considered telephony devices may become telephony devices or IP telephony devices once they are running appropriate software. One example would be a desktop or a laptop computer that is running software that can interact with an IP telephony system over a data network to conduct telephone calls. Another example would be a portable computing device, such as an Apple iPod Touch™, which includes a speaker and a microphone. A software application loaded onto an Apple iPod Touch™ can be run so that the Apple iPod touch can interact with an IP telephony system to conduct a telephone call.

The following description also will refer to telephony communications and telephony activity. These terms are intended to encompass all types of telephone communications, regardless of whether all or a portion of the calls are carried in an analog or digital format. Telephony communications could include audio or video telephone calls, facsimile transmissions, text messages, SMS messages, MMS messages, video messages, and all other types of telephony and data communications sent by or received by a user. These terms are also intended to encompass data communications that are conveyed through a PSTN or VOIP telephony system. In other words, these terms are intended to encompass any communications whatsoever, in any format, which traverse all or a portion of a communications network or telephony network.

Virtual telephone numbers for receiving incoming telephony communications could be used in many different contexts. One example is where a user of a telephony system located in a first country wishes to have a virtual telephone number from a second country assigned to him so that individuals in the second country can call the user via a telephone number which is local to them.

For example, and with reference to FIG. 1, a user of the IP telephony system 120 who makes use of the first IP telephone 108 is located in country A. A telephone number will have been assigned to the user by the IP telephony system 120. Thus, the telephone number associated with the user's IP telephone 108 will be a telephone number from country A. If an individual located in country B who uses the third analog telephone 174 wishes to place a call to the user in country A, the individual would normally use the third analog telephone 174 to place an international long distance telephone call to the user's IP telephone 108 via the PSTN located in country B 140. The PSTN in country B 140 would ultimately route the call to the IP telephony system 120, and the IP telephony system would terminate the call to the user's IP telephone 108.

However, the user in country A could have the IP telephony system 120 assign a virtual telephone number from country B to the user. Once a virtual telephone number from country B has been tied to the user in country A, the individual in country B could dial the virtual telephone number from country B, instead of the telephone number from country A associated with the user's IP telephone 108, to reach the user in country A. Because the call made by the individual in country B would be a local call, the individual would not need to pay any international long distance rates. The IP telephony system 120 would receive the call on the virtual telephone number via a proxy server, a gateway or some other asset which may be located in country B, and the call would be routed over the Internet 110 to the user's IP telephone 108 in country A. The IP telephony system 120 could charge the user for this service. But the charges would most likely be far less than the cost of making an international long distance call from the individual's analog telephone 174 in country B to the telephone number assigned to user's IP telephone in country A.

In another situation, a first user located in country A could utilize a first user's smart phone 136 which receives its native telephony service from the cellular network in country A 130. Thus, the cellular network in country A 130 will have assigned a telephone number from country A to the first user's smart phone 136. However, the user could also be a customer of the IP telephony system 120, and IP telephony software provided by the IP telephony system 120 could be loaded onto the first user's smart phone 136. The IP telephony software makes it possible for the user to conduct IP telephony communications via the IP telephony system 120 whenever the first user's smart phone 136 has established a link to the Internet 110. The link to the Internet 110 could be established via a wireless access point 133, or the first user's smart phone 136 could utilize a data connection provided by the cellular network in country A 130.

Under these circumstances, the user could have the IP telephony system 120 assign a virtual telephone number from country B to the user. Here again, this would allow an individual in country B to dial the virtual telephone number from country B to reach the first user's smart phone 136 in country A. The IP telephony system 120 would receive the incoming call via an asset located in country B, and the call is then routed over the Internet 110 to the first user's smart phone 136. The IP telephony software on the first user's smart phone 136 would then enable the user to conduct an IP telephony communication with the individual in country B. Again, the cost of conducting the telephony communication in this fashion would be considerably less than if the individual in country B had dialed the regular telephone number in country A assigned to the first user's smart phone 136.

Another situation in which a virtual telephone number could be assigned to a user has to do with a system for providing a smart phone user with low cost mobile roaming services. For example, a user of the second smart phone 138 could obtain native telephony service for the second smart phone from the cellular network 130 in country A. As a result, a telephone number from country A would be assigned to the second smart phone 138. If the user travels to country B with the smart phone 138, the cellular network in country B 140 may provide the user with roaming cellular service. However, the cost of obtaining that roaming cellular service would be quite high.

The user of the second smart phone 138 could obtain lower cost mobile roaming service from the IP telephony system 120. Under this scenario, IP telephony software provided by the IP telephony system 120 is loaded on the second smart phone 138. When the user of the second smart phone travels to country B (or any location outside the user's native service area), the user could activate the IP telephony software, and ask the IP telephony system 120 to implement mobile roaming procedures.

The IP telephony system 120 then assigns a virtual telephone number to the user, and the virtual telephone number is one from within the user's regular service area in country A. The IP telephony system 120, or the user himself, then instructs the user's regular cellular network in country A 130 to forward all telephone calls directed to the user's regular telephone number associated with the second smart phone 138 to the newly assigned virtual telephone number. As a result, when somebody dials the user's regular telephone number associated with the second smart phone 138, the call is forwarded to the virtual telephone number assigned by the IP telephony system 120, and the call is received by the IP telephony system 120. Assuming the user's second smart phone, now located in country B, is able to establish a connection to the Internet, such as via the wireless access point 155 in country B, the IP telephony system 120 can then complete the call to the user's second smart phone as an IP call via the Internet 110. Completing the call in this fashion would likely be far less expensive than doing so via a roaming cellular service provided by the cellular network 140 in country B. A complete description of such a mobile roaming service is provided in co-pending application Ser. No. 13/334,849, the entire contents of which are hereby incorporated by reference.

In the first two examples discussed above, a user in a first country asks a telephony system to assign a virtual telephone number from a different country. In the mobile roaming example, the telephony system assigns a virtual telephone number that is from the same country as the user's regular telephone number. Regardless, the virtual telephone numbers are used to receive incoming telephony communications that are directed to the user. In all these cases, there is a cost associated with maintaining the virtual telephone numbers. This cost is initially borne by the telephony system that assigns the virtual telephone numbers, and the costs are ultimately passed along to the users that make use of the virtual telephone numbers.

It is desirable to minimize the costs associated with maintaining virtual telephone numbers, so that the virtual telephone number services can be provided for the most competitive rates. One way of minimizing the costs associated with virtual telephone numbers would be to assign the same virtual telephone number to multiple users. However, this can be problematic if the virtual telephone numbers are used for incoming telephony communications. If the same virtual telephone number is assigned to first and second users, and the IP telephony system receives an incoming call on that virtual telephone number, the IP telephony system must have some way to determine which of the first and second users the call should be routed to.

Figure 3:
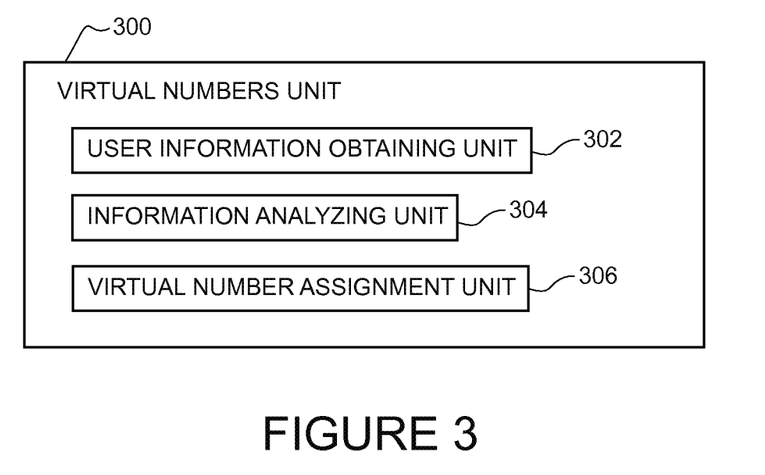
FIG. 3 is a diagram illustrating elements of a virtual number unit that would be part of a telephony system embodying the invention.

FIG. 3 illustrates elements of a virtual telephone numbers unit 300 which could be part of a telephony system, such as the IP telephony system 120 shown in FIG. 1. The virtual numbers unit 300 assigns virtual telephone numbers to users or customers of a telephony system. In some cases, the virtual numbers unit 300 assigns the same virtual telephone number to multiple users. However, the same virtual telephone number is assigned to multiple users only in those circumstances where the telephony system likely will be capable of determining how to route incoming telephony communications directed to that virtual telephone number, as will be explained below.

The virtual numbers unit 300 includes a user information obtaining unit 302 that obtains various items of information about users. This could include telephony related information, such as data from a user's address book or contact list. This could also include telephony communication activity history, such as the telephone numbers to which the user has sent telephony communications and the telephone numbers from which the user has received telephony communications. The obtained information could also relate to different subjects, such as the user's residential address, the identity of the user's employer, any professional affiliations or memberships, information about the user's pastimes, hobbies, religious affiliations, and other items of personal information.

The user information obtaining unit 302 can obtain such information from a wide variety of data sources. Information from user address books or contact lists may already be maintained by the telephony system of which the virtual numbers unit 300 is a part. Alternatively, such information could be obtained from user telephony devices, or from databases and/or software programs stored on user computers. A user's contact information could also be obtained from social networking systems where the user maintains an account. Of course, a user's contact information could also be obtained from other sources.

In some embodiments, the information that is acquired by the user information obtaining unit 302 could include information that goes beyond the user himself. For example, once the user information obtaining unit 302 has determined the identity of the user's contacts from a contact list or address book, the user information obtaining unit 302 could then select one of those contacts and obtain information from the contact's address book or contact list. Doing so would be another way to assess the degree of affiliation between two users.

A user's communication activity could also be accessible to the user information obtaining unit 302 because the virtual numbers unit 300 is a part of a telephony system that provides communications services to the user. However, the user information obtaining unit 302 may obtain user communication activity information from a user's telephony device and/or from third party telephony systems as well.

Personal information regarding a user could be available to the user information obtaining unit 302 through a wide variety of sources, including public databases. A user may also provide various items of personal information when registering for a virtual numbers service with the telephony system which operates the virtual numbers unit 300. Also, such personal information may be available via one or more social networking system where the user maintains an account, or where the user has interacted with someone else that maintains an account.

The virtual numbers unit 300 also includes an information analyzing unit 304 that analyzes the obtained information for one or more users to determine whether it may be possible to assign the same virtual telephone number to two or more users. A virtual number assignment unit 306 then assigns virtual telephone numbers to users based on the analysis performed by the information analyzing unit 304. Details about how the analysis is performed and how the virtual telephone numbers are assigned are discussed below.

Figure 4:
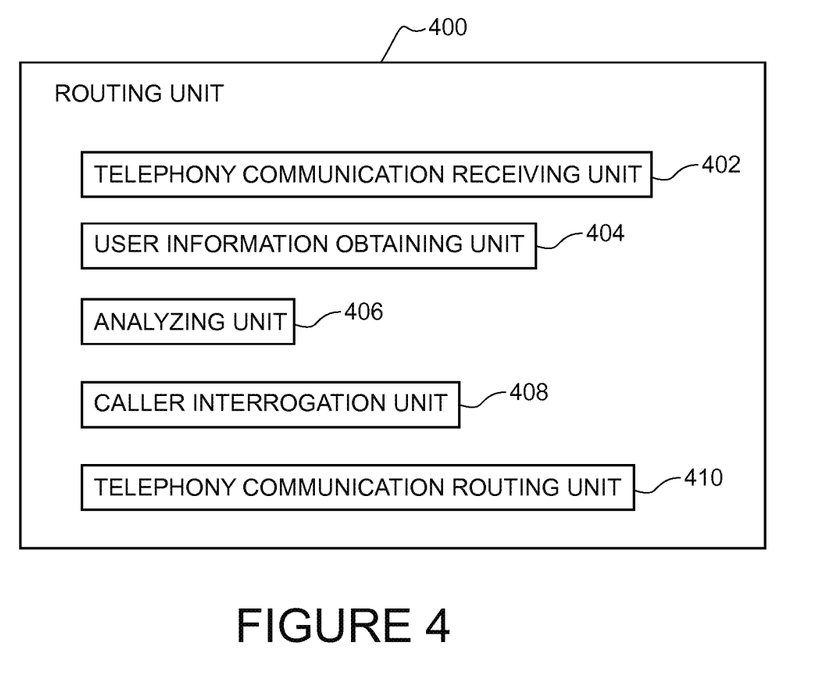
FIG. 4 is a block diagram illustrating elements of a telephony communication routing unit that would be part of a telephony system embodying the invention.

When a virtual telephone number is assigned to only one user, there is no question about how to route an incoming telephony communication directed to the virtual telephone number. However, if a virtual telephone number has been assigned to or associated with multiple users, the telephony system that receives an incoming telephony communication directed to the virtual telephone number must be capable of determining how to route the telephony communication. FIG. 4 illustrates elements of a routing unit 400 that performs this function. The routing unit 400 could also be a part of a telephony system, such as the IP telephony system 120 illustrated in FIG. 1. The routing unit 400 could be part of a routing unit that is responsible for routing all types of incoming telephony communications. Alternatively, the routing unit 400 could be dedicated to routing incoming telephony communications directed to virtual telephone numbers that have been assigned to multiple users.

The routing unit 400 includes a telephony communication receiving unit 402 that receives incoming telephony communications directed to a virtual telephone number that has been assigned to multiple users. A user information obtaining unit 404 obtains information about the users who are associated with the virtual telephone number. An analyzing unit 406 analyzes the obtained information to determine which of the users the incoming telephony communication was intended to reach. A telephony communication routing unit 410 then routes the telephony communication to the correct user. However, if the analyzing unit 406 is unable to determine which user the telephony communication should be directed to, a caller interrogation unit 408 may interact with the caller in an attempt to identify the correct user. Thereafter, the telephony communication routing unit 410 routes the telephony communication to the party identified by the caller. Details about how the elements of the routing unit operate are discussed below.

Figure 5:
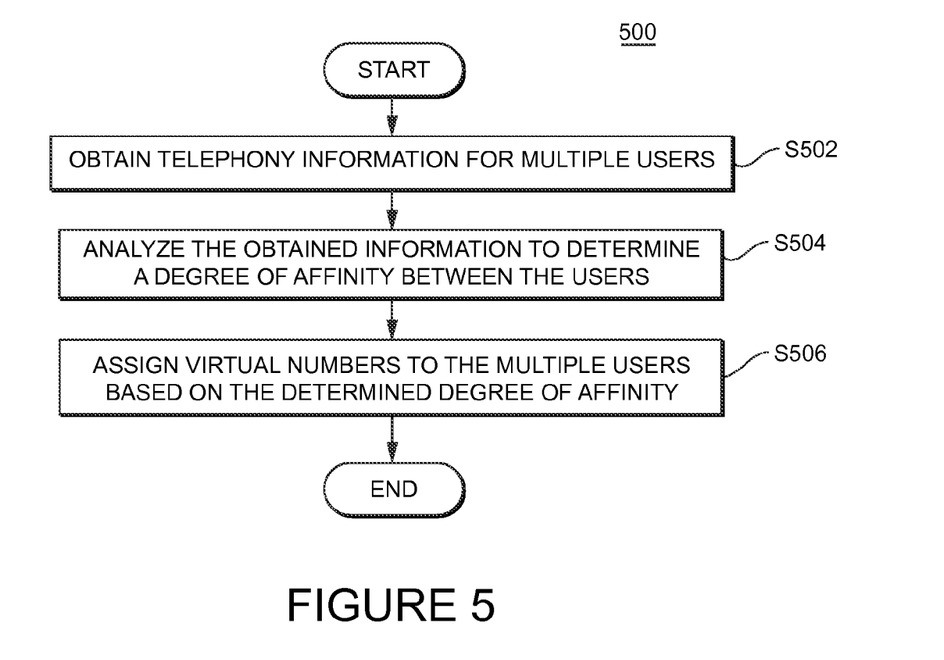
FIG. 5 is a flow chart illustrating steps of a method of assigning virtual telephony numbers embodying the invention.

FIG. 5 illustrates steps of a method that would be performed by the virtual numbers unit 300 to assign virtual telephone numbers to users. In some instances, this would involve assigning a virtual telephone number to only a single user. In other instances, this would involve assigning the same virtual telephone number to multiple users.

The method 500 begins and proceeds to step S502, where the user information obtaining unit 502 obtains information about multiple users. As mentioned above, this could include obtaining various different items of information relating to the users. For purposes of explaining a first embodiment, we will assume that the user information obtaining unit 502 only obtains information from one or more address books or contact lists that are maintained by (or for) first and second users.

In step S504, the information analyzing unit 504 analyzes the obtained information to determine a degree of affinity between the first and second users. This could involve comparing the telephone numbers listed in the address books and contact lists to determine if any telephone numbers appear in both user's address books or contact lists. Likewise, the names appearing in the address books and contact lists could be compared to identify any duplications. The addresses associated with the names may also be used to help distinguish between common names that may actually represent different people.

If there is no duplication between the information in the first and second users' address books and contact lists, this provides a strong indication that the first and second users do not typically communicate with the same parties. And in this case, the analysis would indicate that the same virtual telephone number can be assigned to both of the first and second users. The method then proceeds to step S506, and the virtual number assignment unit 306 assigns the same virtual telephone number to the first and second users.

If the analysis performed in step S504 indicates that there is some degree of duplication between the information in the address books or contact lists of the first and second users, additional information could be reviewed to determine if it is nevertheless possible to assign the same virtual telephone number to both the first and second users without incurring a significant risk of confusion in routing incoming telephony communications directed to the virtual telephone number. For example, in step S502, the information analyzing unit 304 could also obtain information about the telephony communication history for the first and second users over a predetermined period of time. This could include obtaining information about the telephone numbers to which the first and second users sent telephony communications and from which the first and second users received telephony communications over a period of time such as the last year. Here again, in the analysis performed in step S504, the information analyzing unit 304 looks for duplication between the first and second users' communication histories.

For example, if an analysis of the information in the first and second users' address books and contact lists indicates that the same telephone number appears in both users' address books, but an analysis of the first and second users' communication histories indicates that the second user has not sent a single telephony communication to that telephone number or received a single telephony communication from that telephone number over the last year, it would be safe to assume that the second user rarely, if ever, communicates with the individual associated with the telephone number. Under these circumstances, the information analyzing unit may conclude that the same virtual telephone number can be assigned to both the first and second users, despite the fact that the same telephone number appears in the address books of both the first and second users.

In some embodiments, the user information obtaining unit 302 obtains as much information as possible about the first and second users in step S502, and the analysis performed in step S504 makes use of all or a portion of that obtained information. For example, the analysis unit 304 might perform an initial analysis of only the information obtained from the address books and contact lists of the first and second users. If no duplication is found, the analysis is terminated and the method proceeds to step S506, where a single virtual telephone number is assigned to both the first and second users.

If the initial analysis performed in step S504 indicates that there is a significant degree of duplication between the information in the address books or contact lists of the first and second users, this too could end the analysis. The method then proceeds to step S506, and two different virtual telephone numbers are assigned to the first and second users.

If the initial analysis performed in step S504 reveals that a relatively small degree of duplication exists between the information in the address books and contact lists of the first and second users, this could trigger an analysis of the first and second users' communication histories to determine if both the first and second users regularly receive communications from or send communications to the duplicate parties present in both the first and second users' address books or contact lists. As mentioned above, this information may already have been obtained in step S502, or the need for performing this additional analysis may trigger the user information obtaining unit 302 to obtain the first and second users' communication histories. If the additional analysis reveals that the first and second users regularly communicate with the same party, the method proceeds to step S506, and different virtual telephone numbers are assigned to the first and second users. If the additional analysis reveals that one or both of the users rarely, if ever, communicate with the duplicate parties, then the method proceeds to step S506 and the same virtual telephone number is assigned to both the first and second users.

As mentioned above, additional information about the first and second users could be obtained by the user information obtaining unit 302 in step S502, and this additional information could be used to perform the analysis in step S504. If an analysis of the information in the first and second users' address books and contact lists reveals no duplication, and an analysis of the first and second users' communication histories reveals that the first and second users rarely, if ever, communicate with the same party, the analysis could still conclude that it is not advisable to assign the same virtual telephone number to the first and second users. For example, the analysis could note that the first and second users both work for the same company. Under those circumstances, the potential for confusion could be judged too great, and different virtual telephone numbers would then be assigned to the first and second users. Of course, a review of other items of personal information could also indicate that it makes sense to assign different virtual telephone numbers to the first and second users, despite a lack of duplication in their telephony information.

The analysis performed in step S504 could take multiple factors into account in calculating an overall affinity score between first and second users. The results of different analyses of different types of information about the first and second users could be combined to arrive at the affinity score. Also, the different analyses could be weighted differently, depending upon their importance. The overall affinity score could then be compared to one or more thresholds to determine if different virtual telephone numbers should be assigned to first and second users, or if it is acceptable to assign the same virtual telephone number to the first and second users.

Also, although the above description assumed that the obtained information and the analysis was for first and second users, in alternate embodiments, the information for more than two users could be obtained and analyzed to determine if the same virtual telephone number could be assigned to more than two users. Similarly, if a virtual telephone number has already been assigned to first and second users, a method as illustrated in FIG. 5 could be performed to determine if the virtual telephone number also can be assigned to a third user.

A method as illustrated in FIG. 5 might also be performed after a virtual telephone number has been assigned to a first user, to determine if the virtual telephone number also can be assigned to a second user. The same basic procedures discussed above would be performed in steps S502 and S504. However, if the analysis performed in step S504 indicates that the virtual telephone number already assigned to the first user can be assigned to the second user, step S506 would only involve assigning the virtual telephone number to the second user. Also, if the analysis performed in step S504 indicates that the virtual telephone number should not be assigned to the second user, step S506 would involve only assigning a new virtual telephone to the second user. Further, if a new virtual number is assigned to the second user, the entire method could then be performed again to determine if the virtual telephone number assigned to the first user can be assigned to a third user.

Likewise, even after a virtual telephone number has been assigned to first and second users, one could perform a method as illustrated in FIG. 5 to determine if the virtual telephone number also could be assigned to a third user. Thus, the method could be multiple times for a single virtual telephone number to determine if it is possible to assign the virtual telephone number to more than two users.

When performing a method as illustrated in FIG. 5, it may make sense to select two users who are from different geographical locations or who have personal information that is indicative of significantly different backgrounds. The more dissimilar the two users, the more likely they will not be communicating with the same parties and that it will be possible to assign the same virtual telephone number to both users.

The information that is used to determine whether a virtual telephone number can be assigned to multiple parties, by its nature, tends to change over time. Users will place calls to new people and receive calls from new people. Users will update their address books and contact lists to add new entries. Because of the changeable nature of the data, it is advisable to re-perform a method as illustrated in FIG. 5 on a regular basis for virtual telephone numbers that have already been assigned to two or more users. Changes to a user's address book or contact list might, in fact, trigger a virtual numbers unit 300 to re-perform a process as illustrated in FIG. 5. Any changes in a user's telephony information or personal information may reveal that it no longer makes sense to assign the same virtual telephone number to two or more users. If that is the case, the virtual telephone number can remain assigned to one of the users, but a new virtual telephone number would be assigned for the other of the two users.

If the virtual telephone number is one which a user has provided to other people as a means to placing a call to the user, changing the virtual telephone number could represent a serious inconvenience. Thus, assigning the same virtual telephone number to multiple users may only make sense if the virtual telephone number is used for a mobile roaming service, or some other service where the virtual telephone numbers are only known to and used by the IP telephony system, and where changing a user's virtual telephone number is not likely to inconvenience the user or his contacts.

Figure 6:
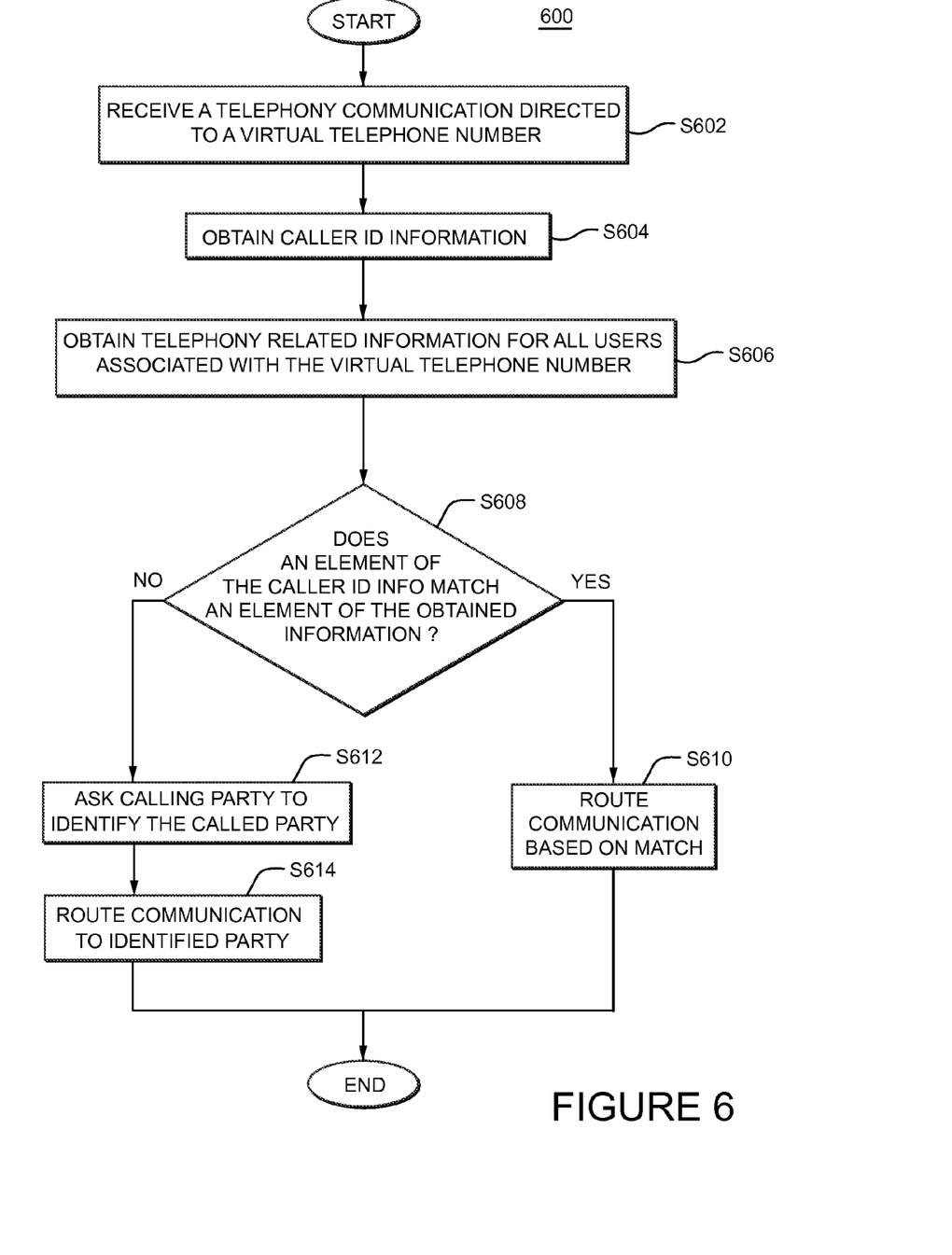
FIG. 6 is flow chart illustrating steps of a method of routing a telephony directed to a virtual telephone number that embodies the invention.

FIG. 6 illustrates steps of a method that would be performed by the routing unit 400 illustrated in FIG. 4 to route an incoming telephony communication directed to a virtual telephone number that is assigned to more than one user. The method 600 begins and proceeds to step S602, where a telephony communication receiving unit 402 receives an incoming telephony communication directed to a virtual telephone number that has been assigned to more than one user. The method proceeds to step S604, where the telephony communication receiving unit 402 obtains caller ID information for the incoming telephony communication. This would likely include at least the telephone number of the calling party. However, the caller ID information could also include a name associated with the telephone number, as well as other information.

In step S606, a user information obtaining unit 404 obtains telephony related information for all the users associated with the virtual telephone number. This could include information from the address books or contact lists of the users, and/or the users' communication histories.

In step S608, an analyzing unit 406 compares items of the caller ID information to items of the users' telephony information obtained in step S606 to determine if one or more items of the caller ID information match the obtained telephony information for one of the users. For example, this analysis may reveal that a telephone number and/or name of the calling party which appears in the caller ID information matches an entry in the address book of a first of three users who have been assigned the virtual telephone number. Similarly, the analysis may reveal that the telephone number in the caller ID information matches a telephone number appearing in the first user's call history. Under these circumstances, the method proceeds to step S610, and the telephony communication routing unit 410 routes the incoming telephony communication to the first user. The method would then end.

If the analysis performed in step S608 does not reveal a match between an item of the caller ID information and the information in any of the users' telephony information, the method proceeds to step S612, and a caller interrogation unit 408 queries the calling party in an attempt to determine the identity of the party they are trying to contact. The query could be accomplished in multiple different ways.

In some embodiments, the caller interrogation unit 408 could include an interactive voice response system that asks the calling party to speak the name of the party they are trying to reach. Speech recognition assets would then be used to interpret the calling party's response and to attempt to match the interpreted response to the name of one of the users who have been assigned the virtual telephone number. In alternate embodiments, the caller interrogation unit could present the calling party with a numbered list of the users who have been assigned the virtual telephone number, and the calling party could press a numbered key corresponding to the appropriate user, or the calling party could speak the number of the user they are trying to reach. The numbered list could be spoken to the calling party, or it might be possible to cause a display screen of the calling party's telephony device to display the numbered list.

Once the caller interrogation unit 408 has received and interpreted the calling party's response to the query, the method proceeds to step S614, and the telephony communication routing unit routes the incoming telephony communication to the identified user. The method then ends.

In some embodiments, if the analysis performed in step S608 reveals that one or more items of the caller ID information matches items of the obtained telephony information for two or more of the users assigned the virtual telephony number, the method could proceed to steps S612 and S614 to query the calling party as to the user they are trying to reach.

However, in some embodiments, before the method proceeds to steps S612 and S614, additional information, such as call histories, could be used to try to determine the identity of the called party. For example, a review of the communication histories of first and second users who have been assigned the same virtual may reveal that the first user communicates with the calling party on a daily basis, but that the second user has not communicated with the calling party for more than a year. Based on this information, the incoming call could safely be directed to the first user. Thus, even when one or more items of the caller ID information matches items of the obtained information for first and second users, it may still be possible to determine who the calling party is attempting to reach using other available information.

In some embodiments, when an incoming call directed to a virtual number is received, matching scores are calculated for each of the users to which the virtual number has been assigned. Even when even when one or more items of the caller ID information matches items of the obtained information for first and second users who are assigned the virtual telephone number, additional information could be used to calculate an overall matching score for each user. And the matching scores could be considerably different from one another. For example, the caller ID information may match telephony information for the first user to a much greater degree than the telephony information for the second user. Under those circumstances, if may be acceptable to route the call to the first user.

It also may be possible for the calling party's telephony device to include information in call setup signaling that identifies the called party in some fashion. For example, a calling party's contact list on his telephony device may include both a party's name and the virtual telephone number that is to be dialed to reach the party. When the calling party requests that a call be placed to the virtual telephone number, the name associated with the virtual telephone number may be included in the call setup signaling, along with the dialed virtual telephone number. If the name of the called party is included in the call setup signaling, the telephone communication receiving unit 402 could extract this information from the call setup signaling. The analyzing unit 406 or the telephony communication routing unit 410 could then check to see could if the name of the called party matches a name of one of the users assigned the virtual telephone number. If so, the call could be immediately routed to the proper party without the need to perform any further analysis.

In the foregoing description, many references were made to an IP telephony system assigning and using virtual telephone numbers. References to an IP telephony system should in no way be considered limiting. Other types of telephony service providers may also assign and use virtual telephone numbers using the systems and methods described above, and recited in the following claims.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of determining how to assign virtual telephone numbers to users of a telephony service, comprising:
    obtaining telephony related information for first and second users of the telephony service, wherein the obtaining step comprises obtaining information from address books or contact lists for the first and second users;
    analyzing the obtained information to determine a degree of affinity between the first and second users, wherein the analyzing step comprises determining how many, if any, entries appearing in the address books or contact lists of the first user match entries appearing in the address books and contact lists of the second user, and wherein the greater the number of matching entries, the greater the determined degree of affinity; and
    determining whether to assign the same virtual telephone number to the first and second users based on the determined degree of affinity.

2. The method of claim 1, further comprising:
    assigning the same virtual telephone number to the first and second users if the determined degree of affinity is lower than a threshold value; and
    assigning different virtual telephone numbers to the first and second users if the determined degree of affinity is greater than or equal to the threshold value.

3. The method of claim 1, wherein determining how many, if any entries appearing in the address books or contact lists of the first user match entries appearing in the address books and contact lists of the second user comprises determining if the same name or same telephone number that appears in the address books or contact lists of the first user also appears in the address books or contact lists of the second user.

4. The method of claim 1, wherein the obtaining step further comprises obtaining telephony communication histories for the first and second users, and wherein the analyzing step also comprises determining if at least one telephone number appears in the obtained telephony communication histories of both the first and second users.

5. The method of claim 1, further comprising obtaining personal information for the first and second users, and wherein the analyzing step comprises also analyzing the obtained personal information to determine a degree of affinity between the first and second users.

6. The method of claim 1, wherein the obtaining step further comprises obtaining telephony communication histories for the first and second users, and wherein the analyzing step further comprises determining how many, if any, telephone numbers appearing in the obtained telephony communication history of the first user also appear in the obtained telephony communication history of the second user.

7. The method of claim 5, wherein obtaining personal information comprising obtaining information about at least one of the employers and residential locations of the first and second users.

8. The method of claim 6, wherein the analyzing step further comprises determining a degree of affinity between the first and second users based on the number of telephone numbers that appear in the obtained telephony communication histories of both the first and second users.

9. A system for determining how to assign virtual telephone numbers to users of a telephony service, comprising:
   means for obtaining telephony related information for first and second users of the telephony service, wherein the obtaining means obtains information from address books or contact lists for the first and second users;
   means for analyzing the obtained information to determine a degree of affinity between the first and second users by determining how many, if any, entries appearing in the address books or contact lists of the first user match entries appearing in the address books and contact lists of the second user, wherein the greater the number of matching entries, the greater the determined degree of affinity; and
   means for determining whether to assign the same virtual telephone number to the first and second users based on the determined degree of affinity.

10. A system for determining how to assign virtual telephone numbers to users of a telephony service, comprising:
   a user information obtaining unit comprising at least one processor that obtains telephony related information for first and second users of the telephony service, wherein the user information obtaining unit obtains information from address books or contact lists for the first and second users; and
   an information analyzing unit comprising at least one processor that analyzes the obtained information to determine a degree of affinity between the first and second users by determining how many, if any, entries appearing in the address books or contact lists of the first user match entries appearing in the address books or contact lists of the second user, wherein the greater the number of matching entries, the greater the determined degree of affinity and wherein the information analyzing unit also determines whether to assign the same virtual telephone number to the first and second users based on the determined degree of affinity.

11. The system of claim 10, further comprising a virtual number assignment unit comprising at least one processor that assigns the same virtual telephone number to the first and second users if the determined degree of affinity is lower than a threshold value and that assigns different virtual telephone numbers to the first and second users if the determined degree of affinity is greater than or equal to the threshold value.

12. The system of claim 10, wherein the information analyzing unit determines how many, if any, entries appearing in the address books or contact lists of the first user match entries appearing in the address books or contact lists of the second user by determining if the same name or same telephone number that appears in the address books or contact lists of the first user also appears in the address books or contact lists of the second user.

13. The system of claim 10, wherein the user information obtaining unit also obtains telephony communication histories for the first and second users, and wherein the information analyzing unit also determines if at least one telephone number appears in the obtained telephony communication histories of both the first and second users.

14. The system of claim 10, wherein the user information obtaining unit also obtains personal information for the first and second users, and wherein the information analyzing unit also analyzes the obtained personal information to determine a degree of affinity between the first and second users.

15. The system of claim 10, wherein the user information obtaining unit obtains telephony communication histories for the first and second users, and wherein the information analyzing unit also determines how many, if any, telephone numbers appearing in the obtained telephony communication history of the first user also appear in the obtained telephony communication history of the second user.

16. The system of claim 14, wherein the user information obtaining unit also obtains information about at least one of the employers and residential locations of the first and second users.

17. The system of claim 15, wherein the information analyzing unit also determines a degree of affinity between the first and second users based on the number of telephone numbers that appear in the obtained telephony communication histories of both the first and second users.

* * * * *